A. T. HASSINGER.
MILK AND CREAM TESTER.
APPLICATION FILED MAR. 26, 1914. RENEWED JUNE 19, 1916.
1,355,969. Patented Oct. 19, 1920.
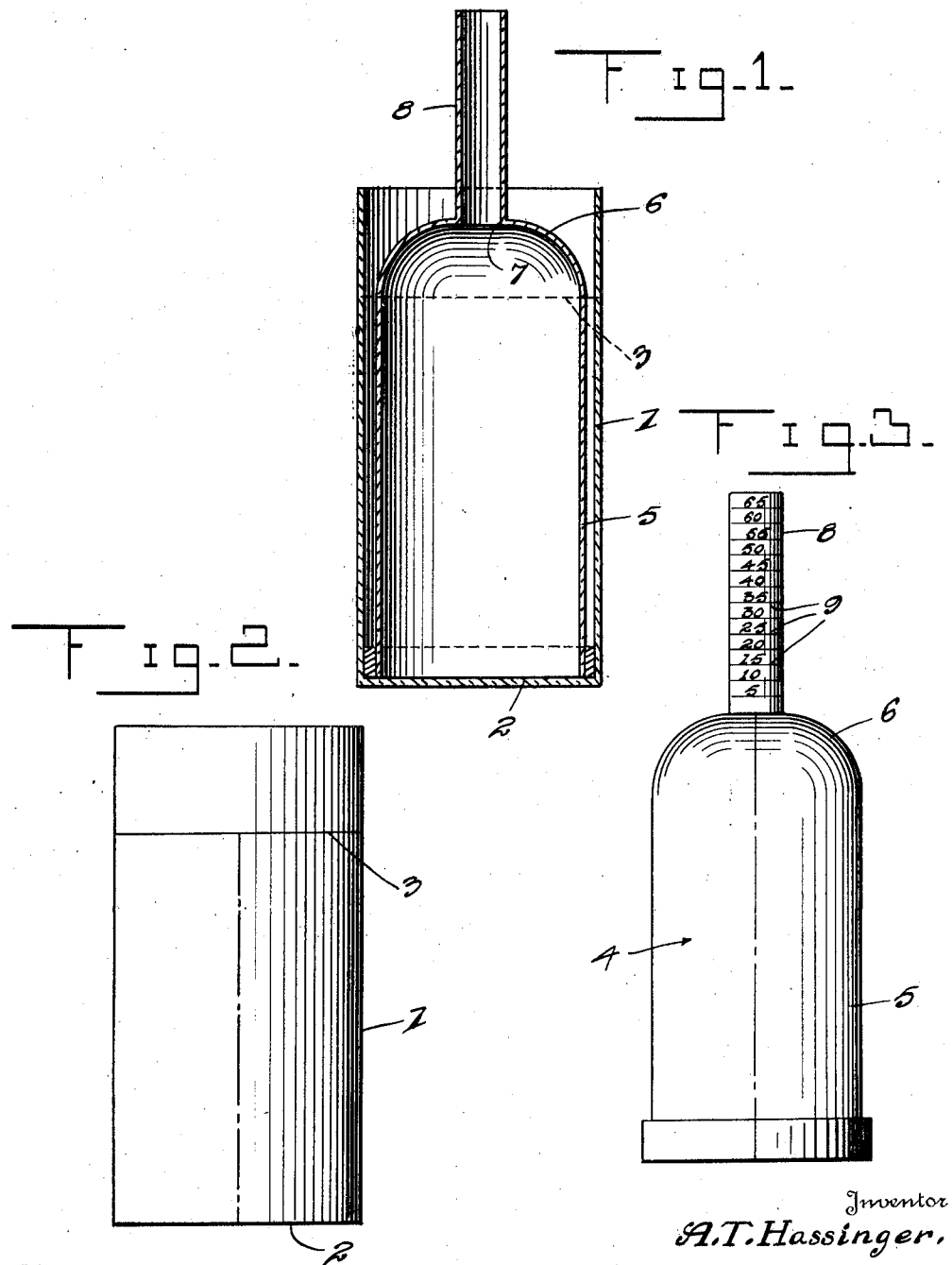

UNITED STATES PATENT OFFICE.

ADOLPH T. HASSINGER, OF GREENVILLE, WISCONSIN.

MILK AND CREAM TESTER.

1,355,969. Specification of Letters Patent. Patented Oct. 19, 1920.

Application filed March 26, 1914, Serial No. 827,266. Renewed June 19, 1916. Serial No. 104,574.

*To all whom it may concern:*

Be it known that I, ADOLPH T. HASSINGER, a citizen of the United States, residing at Greenville, in the county of Outagamie and State of Wisconsin, have invented certain new and useful Improvements in Milk and Cream Testers; and I do hereby declare the following to be a full, clear, and exact description of the invention, such as will enable others skilled in the art to which it appertains to make and use the same.

This invention relates to new and useful improvements in milk and cream testers, and has for its principal object to provide a device which is arranged to determine by gravity and volume the quantity of butter fat in milk or cream in a reliable and efficient manner.

Another object of the invention is to provide a cream tester which is made of glass or similar material and which will not affect the milk or cream which is being tested and render the same unsalable or unfit for use.

A further object of the invention is to provide a reliable and efficient means for determining the per cent. of butter fat contained within the milk or cream to eliminate the necessity of sending the milk to a tester.

With these and other objects in view, the invention consists in the novel combination and arrangement of parts which will be fully set forth in the following specification and accompanying drawings, in which, Figure 1 is a longitudinal sectional view of a milk and cream tester constructed in accordance with this invention, showing the same in its assembled position, Fig. 2 is a side view in elevation of a portion of the milk and cream tester, and, Fig. 3 is a view similar to Fig. 2 of the inner portion of the milk and cream tester.

Referring now to the drawings by characters of reference, the numeral 1 designates the hollow cylinder which is formed of glass or similar material and has formed at its lower extremity the closure 2. The upper end of the cylinder 1 is open as illustrated and is arranged to receive the milk or cream which is being tested. A suitable line 3 is formed on the exterior of the cylinder 1 at a spaced distance from the bottom and is arranged to form a gage to indicate the height of the milk in cylinder 1, equal in volume to the capacity of cylinder 4 to the point where the tubular extension 8 joins the cylinder 4 when the same is to be put in place.

The inner member which is designated generally by the numeral 4, comprises the hollow cylinder 5 having formed at one end the dome-shaped closure 6 having the centrally located aperture 7 formed therein, and the upwardly extending tubular member 8 formed integral therewith. The opposite end of the tubular member 5 is left open and is arranged to snugly fit within the cylinder 1 hereinbefore described. A plurality of graduations 9 are formed on the exterior of the cylindrical portion 8 and are arranged to indicate to the user the per cent. of butter fat in the cream or the milk when the same is being tested.

It will be apparent from the foregoing that in use the receptacle formed by the cylinder 1 and the closure 2 is filled with predetermined weight of the liquid and upon inserting the cylinder 4 within the cylinder 1, it will be apparent that the liquid will be forced upwardly and it will be apparent since the cylinder 4 is of the same capacity from the point where the tubular extension joins, to its bottom, as the cylinder 1 contains from the line 3 to its bottom, the amount of liquid above the line 3 on cylinder 1 will be forced upwardly and into the tubular extension 8, to a point even with or near one of the graduations 9 and the user may thus determine by glancing at the graduations and the height of the liquid the quantity or per cent. of butter fat contained therein. In this way it will be evident that considerable time and trouble is eliminated in testing cream and that the same may be used without any danger of contamination from the use of chemicals or similar processes now used.

From the foregoing it will be evident that in use the approximate amount of milk is weighed which will fill the container 1 to a level with the line 3. This weight is then used as a standard and the milk to be tested is then weighed so as to reach a point either above or below the line 3 within the container 1. The richer the milk, the more volume there will be, therefore it will be seen that the milk will rise to a point above the line 3 within the container 1. Upon the insertion of the container 5, it will be evident that the milk will rise into the tube 8 so that upon glancing at the graduation, the per cent. of butter fat within the milk may be readily determined. In event that the milk from a different source is to be tested, it will be readily seen that the proper quantity is weighed out and placed in the container 1 and according to the amount of butter fat, it will be seen that the level will rise to a point above or below the line 3, whereupon the container 5 is then slid in place and the operation repeated. In this way it will be evident that various quantities of milk from different sources may be tested for the amount of butter fat and due to the fact that the greater the butter fat, the greater the volume, it will be evident that an accurate test of the milk may be made which will give the exact percentage of butter fat.

While in the foregoing there has been shown and described the preferred embodiment of this invention, it is to be understood that such changes may be made in the combination and arrangement of parts as will fall within the spirit and scope of the invention as defined in the appended claims.

Having thus described my invention, I claim:

1. The combination with a hollow cylinder having a closure formed at one end, of a second cylinder adapted to fit within the first cylinder, said second cylinder being provided with an apertured dome-shaped closure at its opposite end, and a collar formed integral with the apertured dome-shaped closure and projecting upwardly therefrom, said collar registering with the aperture in the dome-shaped closure and being provided with graduations to enable the user to easily determine the quantity of butter fat contained in milk or cream.

2. In a device of the character described, the combination with a cylinder having a closure at one end, of a second cylinder, a dome-shaped closure formed at one end of the second cylinder, the opposite end of the second cylinder being left open, said dome-shaped closure being provided with a centrally located aperture, and an upstanding cylindrical member formed integral with the second mentioned dome-shaped closure and surrounding the openings formed therein, said cylindrical extension being provided with a plurality of graduations on its exterior whereby when the same is inserted in the first mentioned cylinder, the liquid contained in said cylinder will be forced into the tubular extension and the user may determine by glancing at the height of the liquid within the extension and the graduations, the per cent. of butter fat in the milk or cream when the device is in use.

3. In a device of the kind described, an outer vessel open at its top, an inner vessel of smaller cross-sectional area, open at its bottom, and adapted to be pushed down into the outer vessel to displace liquid from the outer vessel into the inner vessel, said outer vessel and inner vessel having a liquid tight fit and said inner vessel having an extension of relatively small cross-sectional area projecting up from its upper end and into which the liquid is adapted to rise, the upper end of the extension being open to the atmosphere.

4. In a device of the kind described, an outer vessel open at its top, an inner displacer vessel of smaller cross-sectional area open at its bottom, and adapted when pushed down into the outer vessel to displace liquid from the outer vessel into the inner vessel, means carried by the lower end of the displacer causing it to make a fluid tight fit with the outer vessel, said inner vessel having a closed top and a tubular extension thereon of relatively small area, open at its upper end and into which the liquid is adapted to rise.

5. In a device of the kind described, an open topped container, an open bottomed displacer adapted to be pushed down into the container to displace liquid from the container into the displacer, means carried by the displacer for causing all of the liquid in the container to enter the displacer, a vertical tubular extension on the top of the displacer, and scale means associated with said extension for indicating the rise of liquid therein.

6. In a device of the kind described, a container for holding a predetermined weight of liquid, an open bottomed displacer of smaller cross-sectional area than the container fitting within the container and adapted to be depressed to displace the liquid from the container into the displacer, the displacer having a closed top and a tube extending up from said closed top into which the displaced liquid is adapted to rise, and scale graduations carried by said tube for indicating the height of liquid therein.

In testimony whereof I affix my signature in presence of two witnesses.

ADOLPH T. HASSINGER.

Witnesses:
P. J. DALEY,
A. H. GRUNDEIS.